( •—• Added as pelletized with open hearth dry dust
  ○---○ Added as non pelletized )

United States Patent Office 3,489,549
Patented Jan. 13, 1970

3,489,549
SINTERING MATERIAL FROM IRON-CONTAINING DRY DUST AND PREPARING METHOD THEREOF
Yoshimitsu Jomoto, Muroran-shi, Takaaki Hayashi, Tokyo, and Tomoro Hagiwara, Muroran-shi, Japan, assignors to Fuji Iron & Steel Co., Ltd., Tokyo, Japan
Filed Dec. 21, 1966, Ser. No. 603,541
Claims priority, application Japan, Dec. 29, 1965, 40/81,322
Int. Cl. C21b 1/10
U.S. Cl. 75—5
3 Claims

ABSTRACT OF THE DISCLOSURE

A method for preparing pelletized sintering materials from a combination of iron-containing dry dust and finely powdered ore by mixing the iron-containing dry dust, having a moisture content of less than 1.5 percent and a particle size of less than one micron, with finely powdered ore having a moisture content between 2 and 10 percent, then granulating the mixture into rice grain size green pellets and, while granulating, adjusting the moisture content of the pellets between 5 to 9.5 percent and similarly adjusting the particle size of the pellets between 2 to 5 mm. The iron-containing dry dust can be obtained by separating it from the exhaust gases from an oxygen making steel operation or from other steel making processes. The finely powdered ore is crushed or ground prior to the mixing of the iron dry dust, whereby it is placed in condition for mixing.

SUMMARY OF THE INVENTION

The present invention relates to a sintering material made from iron-containing dust and to a method for preparing such sintering materials by mixing very fine iron-containing dry dust, which has been collected by a dry process and contains substantially no water, with iron ore powders which are so fine that they cannot be sintered efficiently, and forming the mixture into small ball pellets.

Iron-containing dust produced in oxygen steel making processes in which a great amount of oxygen is used, is in the form of a very fine powder having a particle size below 1 micron. But such dust has a high content of iron and can be utilized as iron-making material if processed by a suitable method. To date many approaches have been tried for this purpose. These approaches can be classified as hereafter set forth.

In one method iron-containing dust alone, or a mixture of iron-containing dust with iron ore or the like, is mixed with a suitable binder and shaped and then charged into a refining furnace without firing. In another method, the dust or the mixture, together with a suitable binder or combustible material, is mixed and shaped and, after firing to attain increased strength, is charged into a refining furnace. Further, an additional step of removing the impurities contained in the iron-containing dust is performed in combination with the above treatments to enhance the utility value of the dust. The impurities are rendered by feeding the material into a refining furnace. It has been also proposed that the iron-containing dust alone, or a mixture of the iron-containing dust with other iron ore, is shaped into pellets or prepared into a sintering material.

The last mentioned method, where the dust is utilized as pellet or sintering material, may be further classified into two subclasses by the manner in which the dust is collected, to wit by a dry method or a wet method.

Figure 1:
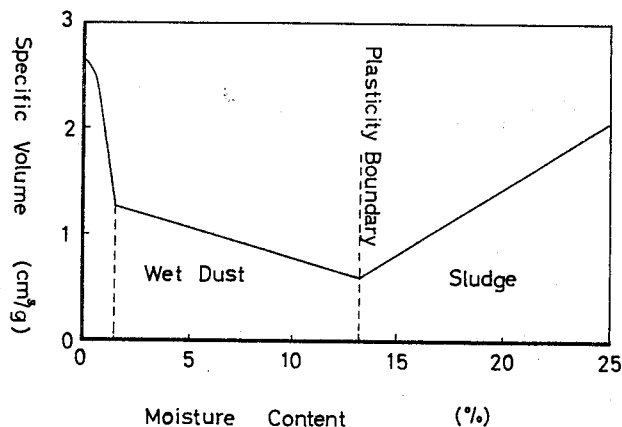
Figure 2:
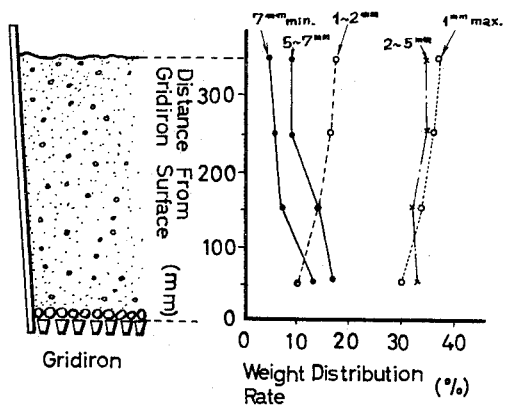
Figure 3:
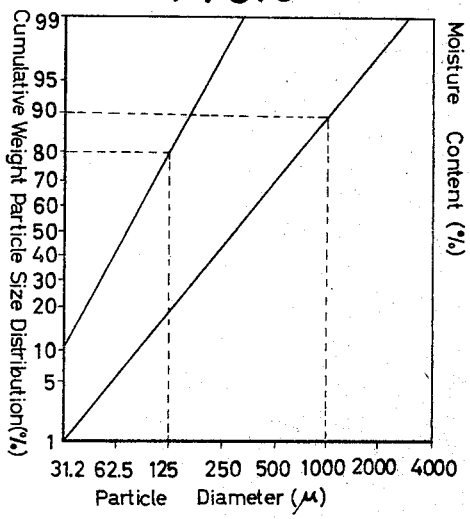
Figure 4:
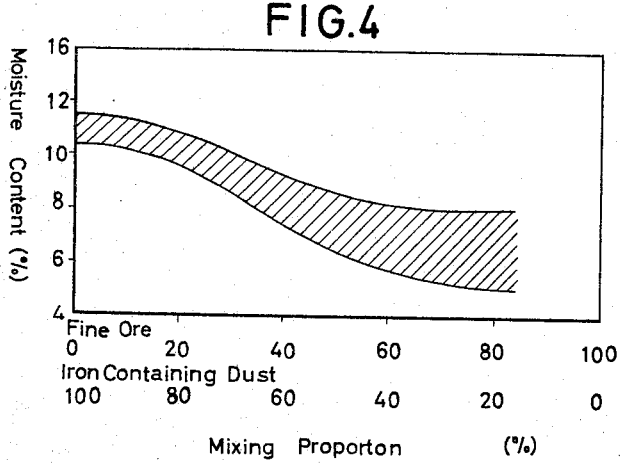
Figure 6:
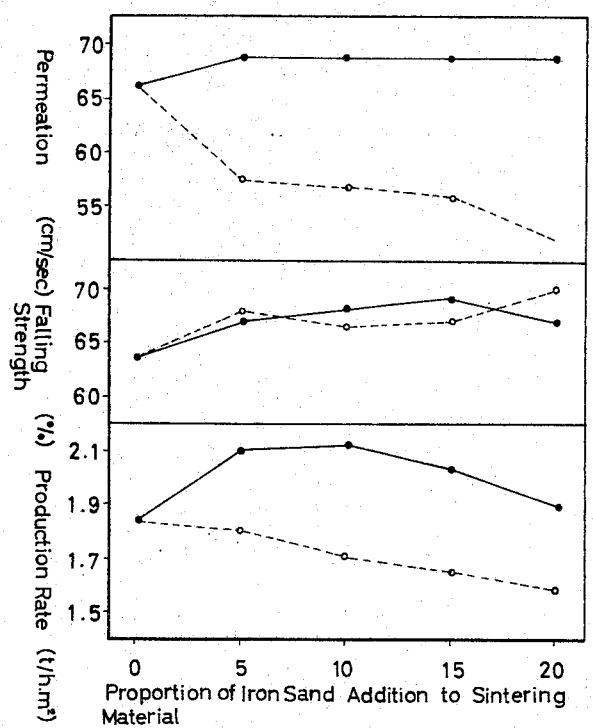
Figure 5:
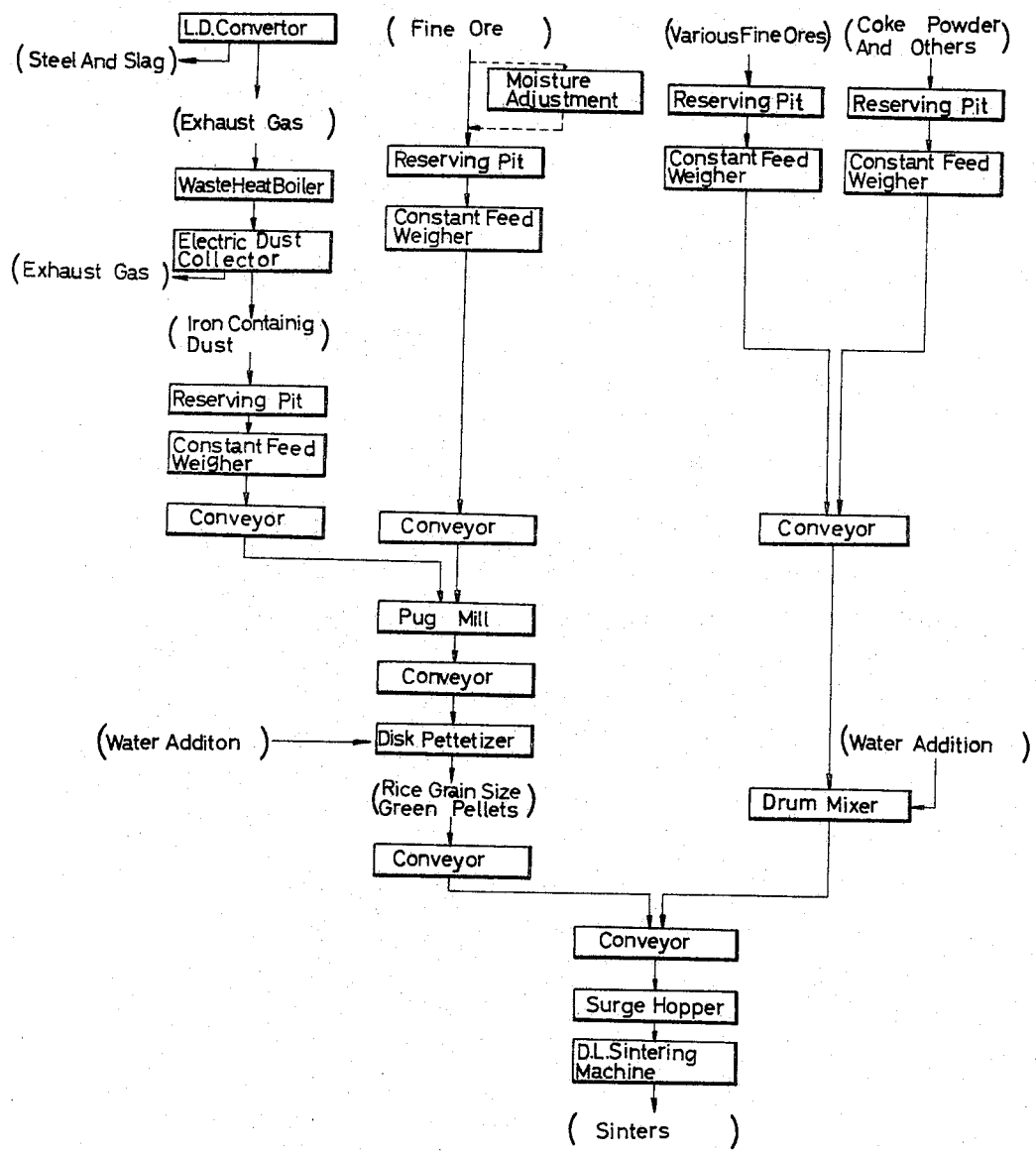

The present invention will be described referring to the attached drawings, in which FIG. 1 shows the variation of the specific volume of the iron-containing dust due to the moisture content, FIG. 2 shows the particle distribution of the sintering material charged into a sintering machine, FIG. 3 is a graph showing the suitable particle range of fine iron ore to be used in the present method, FIG. 4 is a graph showing an adequate moisture content for pelletizing in the case of a mixture of iron-containing dry dust and fine iron ore, FIG. 5 is a diagram showing the manufacturing steps of the sintering material according to the present invention and FIG. 6 is a graph showing the sintering properties of the sintering material produced according to the present invention.

FIG. 1 shows the influence of water addition on the specific volume of the iron-containing dust having a particle size smaller than 1 micron, the dust having been produced during an oxygen steel making process. As shown in the figure, the specific volume sharply decreases with the moisture fluctuating from 0 to about 1.5%. This is due to the fact that the added water reduces the friction among the particles and permits compression. The dust within this moisture range is easily scattered and shows the same properties as it shows when it does not contain water.

The term "the dry dust" used in this invention means dust within this moisture range. At an increased moisture, say more than 1.5%, the rate of the specific volume continues to decrease but at a lesser rate. This is due to the fact that an agglomerating action occurs and the cohering particles are subjected to a "spanning phenomenon." The dust within this moisture range is difficult to scatter and maintains wet properties. It may thus be called "wet dust."

As the moisture content increases to above 13–14%, the air remaining in the interspaces between the dust particles is completely expelled and the interspaces are filled with water. The particles are separated from each other by the water film, and thus the specific volume sharply increases and the mixture of the dust and water begins to show plasticity. The turning point at which the tendency of the specific volume to decrease turns into a tendency to become larger, corresponding to the point where the air contained in the interspaces of the particles is expelled and this point is called the "plasticity limit."

When the moisture reaches 29–30%, the mixture of the dust and water shows fluidity, and this critical point is called the "liquid limit."

In the wet process where the dust is washed and collected, the washing water is introduced into a precipitation pit where the dust is recovered by settlement. This precipitant is called "sludge." All the interspaces of this sludge should be, in view of process employed, filled with the washing water and would not contain air. The sludge is taken out of the pit in a fluid condition by pumping. Thus the content of this sludge is above the liquid limit. The sludge, when dehydrated, is sometimes still referred to as sludge, but more usually is called "mud." This mud cannot be dehydrated to an extent that air will be admitted to the interspaces of the dust particles and thus have a moisture content above the plasticity limit. When the sludge is further dehydrated by a vacuum filter and a centrifugal machine, the product is called "cake." This cake also cannot be dehydrated below the plasticity limit.

Therefore, when the dust is collected by a wet process, the product always has a moisture content above the plasticity limit, and is in a sticky or muddy condition. This muddy condition is classified into either "a slurry zone," which corresponds to the muddy condition over the liquid limit, and "a capillary region" which corresponds to the muddy condition between the plasticity limit and the liquid limit.

Meanwhile, a non-sticky condition in which the dust has a moisture content below the plasticity limit and the dust particles are in continuous contact with each other, and the water particles are also in continuous contact, is called a "funicular region." Another dry condition in which the dust particles continuously contact with each other, and the air particles are also in contact with each other, but the water in the interspaces of the dust particles is in a discontinuous condition is called the "pendulous region."

When the powder dust, which has been collected by a wet process, is to be prepared into pellets or sintering materials, if the dust is in a sludge condition, the mixture of powder dust and water remains in the capillary region or the slurry zone, and thus it is natural that the sticky or muddy nature of the region is utilized as disclosed in Japanese patent publication Sho 35–8202. On the contrary, when the powder dust, which has been collected in a dry process is to be utilized, it is a common practice to add water to the dust to bring it into the pendulous region, and then compress and shape it by mechanical pressure. Alternatively it is possible to increase the moisture content to bring the dust into the funicular region and then subject it to a so-called semidry (or semiwet) press forming by a rolling granulation method utilizing the water suction due to the capillary action as well as the compressing action due to gravity or centrifugal force.

According to the present invention, an iron-containing dust having a moisture below 1.5% (which has been collected by a dry process, is subjected to a rolling granulation within the funicular region to obtain a sintering material.

In general, it is necessary that the moisture and the size of the granulated material be maintained within suitable ranges when very fine material is charged into a sintering machine. Namely the moisture content of premixed feed material to be charged into a sintering machine is usually 6–8%, although this percentage may exceed 10% in the case of a special mixture. Therefore, it is preferable for the granulated material to have a similar moisture content, and if the moisture content is exceedingly high, a troublesome operation is needed to regulate the moisture of the other materials to be mixed with the dust as disclosed in Japanese patent publication Sho 39–1801. Referring to the granular size of the material, about 5 mm. is desirable. If the granular size is exceedingly large, the sintering action does not penetrate into the center of the granules, on the other hand if the granular size is too small, the permeation of air into the material is hindered.

As shown in FIG. 2, when the sintering material is charged into a sintering machine, granular maldistribution takes place; most of the coarser granules ranging between 5–7 mm. and above than 7 mm. gather at bottom surface of the body of sintering material, while the finer granules having a size of between 1–2 mm. gather mainly at the upper surface. Meanwhile granules ranging between 2–5 mm. are distributed almost uniformly through the body of the sintering material. Therefore, it is most desirable to maintain the granular size between 2–5 mm. to obtain good sintering properties and uniform quality of the sintered material when a material is being granulated and then charged into a sintering machine.

An adequate moisture content for granulating iron containing dry dust by the rolling granulation method is generally 10% and above, while the general moisture content in the dust from oxygen steel making process is about 11%. This level is too high for the granules to be charged into a sintering machine, because in the rolling granulation method, the granulation is carried out in the funicular region. In the funicular region air is expelled from the interstices between the particles by the capillary action of the water and by the compression forces developed by gravitational or centrifugal forces (a part of the air remains as confined) and thus the moisture content should be 80–90% of the moisture content at the plasticity limit. However, when iron-containing dry dust is mixed with particles of an adequate size range, the total moisture content of the mixture can be reduced to coincide with the moisture content suitable for sintering since the water added does not diffuse into the interior of the particles added to the dust. For the mixture of the above-mentioned materials, finely powdered ores having a particle size distribution hereinafter explained are suitable.

FIG. 3 is an illustration of the so-called logarithmic normal probability type distribution of particle size, in which the diameter of particle is shown by a logarithmic scale and the cumulative weight distribution rate by a normal probability type of scale. In the figure, the region $a$ on the left side of the straight line which connects the point of 31.2 micron and 10% with the point of 125 micron and 80% represents a known region in which the granulation can be carried out without addition of any binder. The region $c$ on the right side of the straight line which connects the point of 31.2 micron and 1% with the point of 1000 micron and 90% stands for a region in which the particles are suited to be sintered by themselves and the sintered product is not adversely influenced to an appreciable extent. Region $b$ located between these between the aforesaid two straight lines indicates a region in which the particle sizes are too small and have poor sintering properties. Further, in this region granulation cannot be carried out unless a binder is used. The particle size distribution of the material suitable to be mixed with the dust according to the present invention must fall in region $b$. This is due no only to the fact that the particles of region $a$ are in a funicular region while the material admixed contains a certain amount of granulating moisture and therefore is only slightly effective in reducing the total granulating moisture content but also because the particles of the region $c$ are too coarse to produce a mixture in which their surfaces are completely covered by iron-containing dust. The exposed edges of these incompletely coated particles in region $c$ make smooth granulation difficult and increase the abrasion of mixing and granulating machines. Thus, the particles sizes in region $b$ are preferable to those in regions $a$ and $c$. With regard to particles in regions $a$ and $c$, however, those located in an area close to the region $b$ may be employed without any serious effect influence as long as 60% or more of particle size distribution falls within the range of region $b$ with the balance falling in the adjacent area of regions $a$ or $c$.

However, even those particles disposed within the above-mentioned range of particle size distribution which are porous, such as coke powder, do not provide the desired effect of reducing the total moisture content since they absorb and hold water into their pores.

Thus, blast furnace dust which is employed, for example, according to the inveition of Japanese patent publication Sho 36–14108, contains large amounts of highly porous materials such as coke powder, sintered ore powder and the like and such dust is not suited to the present invention as its normal moisture content is naturally in excess of 10%.

In the case of a mixture prepared from finely powdered ores of the above-mentioned preferred range of particle size distribution and extremely fine iron-containing dry dust, the required moisture content for granulation is in the region shown between the lines in FIG. 4. As seen in FIGURE 4, the moisture content varies somewhat widely since the value of the required moisture content for granulation has a tolerance of about ±0.5% and varies up to approximately 2% according to the particle size and the other properties of the finely powdered ore admixed. In order to be able to balance the moisture content of the mixture with that of any composite raw material to which it is added before being sintered it is necessary to admix finely powdered ores with the dust in an amount above 40% of the mixture. However, since mixing too great an amount of ore powder has the effect of reducing the granulating characteristic of the finely powdered ore and makes it impossible to obtain a sufficiently strong granulated product, the upper limit of mixing the powdered ore with the dust should be kept below about 85% of the moisture. Further, in a special case where the moisture content of the composite raw material to be mixed with the dry dust is about 10.5–11.5% it is possible to balance the moisture content of the composite sintering material using only the iron containing dry dust. However, in practice it is undesirable to do so since it reduces the amonut of finely divided ore of finely divided ore mixed to less than 40%. Indeed, because iron-containing dry dust has an extremely fine particle size and a large specific surface area, the addition of water to the dust causes a strong tendency to agglomerate and hinders the added water from being uniformly distributed. This condition makes it so difficult to achieve smooth rolling of the composite material in the granulating machine so that the granulated product is obtained only in an irregular configuration. Moreover, in a sintering material where the amount of finely divided ore in the mixtures is less than 40%, removal of water by rapid heating causes the formation of cracks which are undesirable in a sintered material. Therefore, the mixing rate of the finely divided ores should be between 40 and 85% and the mixing rate of the iron-containing dry dust should be between 15–60% of the mixture. Further, according to FIGURE 4 based on the above-mentioned mixture percentages, the moisture content of granulated product should be between 5–9.5%, the moisture content may be adjusted to coincide with the corresponding mixing proportions of the material.

A distinctive feature of the present invention resides in the manner of mixing finely powdered ore with iron-containing dry dust. When the materials are mixed in a dry state, the dust is scattered to a great extent and it takes a long time to attain a state of complete mixing. Moreover, as mentioned above the large amount of specific surface makes it difficult to uniformly distribute the added water. However, when finely powder ore in a moist state is mixed with iron-containing dry dust, the dust adheres to the water film and provides a uniform covering on the surface of the ore particles, the spaces between the particles are then filled with water as a result of a capillary action until the water escapes from the surface of the dust dayer and catches an additional amount of dust, so that each particle of ore becomes enveloped in a layer of iron-containing dry dust. This method of operation can be carried out quickly and easily and effectively prevents the spreading of the dust. However, since iron-containing dry dust having a moisture content of above 1.5% tends to agglomerate and is unable to evenly cover the surface of the ore particles, the moisture content of the iron-containing dry dust must be limited to not more than 1.5%.

On the other hand, the finely powdered ore must have a moisture content of more than 2% because unless the combined moisture content of the mixture of the ore and the iron-containing dry dust amounts to 1.5% and above, the iron-containing dry dust will not tend to agglomerate or to adhere to the surface of ore particles. Further, the moisture content of finely divided ore must not be too much greater than that of the final composite material in order to effectively carry out the granulating operation it is preferable to partially adjust the moisture content at the time of charging the granulating machine and then controllably add water to the contents of granulating machine as it proceeds with its operation. Thus, the granulated material prepared should have a moisture content lower than that of the sintering composite material, this requirement being fulfilled by adjusting the moisture content of the finely divided ore to be equal to that of sintering composite material but less than 10%.

Fine particles of ore which are covered with iron-containing dust can be granulated to pellets of 2–5 mm. in diameter by means of any type of rolling granulating machine because in the rolling granulating method nuclei of a size between 2–5 mm. are formed first and the nuclei then grow, by surface adhesion of raw material, into granules of the desired size. The desired granular size can be successfully achieved by regulating the staying time of the granules in the granulating machine to attain the formation of nuclei and keeping any subsequent adhesion effect under control. Furthermore, the fine ore particles covered with iron-containing dust, tend to roll more readily in the granulating machine and can be granulated far more easily than either iron-containing dust or finely divided ore alone.

The rice grain size green pellets prepared by the above method, being strongly consolidated by the agglomerating power of iron-containing dust consists of extremely fine particles having high mechanical strength, which do not collapse in transportation. Moreover, since the pellets have a moisture content equal to that of the sintering composite material and have particle sizes evenly distributing throughout the depth of the sintering layer, by simply adding them to other mixed raw materials it is sufficient to attain thorough mixing by the effect produced during moving from one conveyor and to another and charging into a surge hopper. Accordingly the mixture can be introduced into a sintering machine without subjecting it to any special operation such as moisture regulation or mixing.

One example of the process according to the present invention shall be described referring to FIG. 5.

Iron-containing dust, one of the materials for producing rice grain size green pellets, is contained in the exhaust gas produced during the steel making by the L. D. process. It is collected in a dry state, namely as iron-containing dry dust, by passing the exhaust gas, after use in a waste heat boiler, through an electric dust collector, and the collected dust is transferred to a reserve pit where it is stored.

Meanwhile finely powdered ore, another material employed for producing rice grain size green pellets, is readily transferred to a finely powdered ore reserving pit when its grain size distribution and moisture content satisfy the requirements for producing rice grain size green pellet. Additionally the finely powdered ore may be subjected to a crushing step (not shown in the drawings) when the grain size distribution is not adequate or it may be subjected to dehydration or moisturizing to adjust the moisture content when the moisture content is insufficient and finally the powdered ore is stored in a reserving pit.

The iron-containing dry dust and the finely powdered ore are removed by means of a food weigher at a constant rate from the pits according to the mixing proportion required to produce the desired rice grain size pellets. The materials removed from the reserving pits are transferred by belt conveyers and charged into a pug-mill and mixed. The mixed materials are then charged into a disk type pelletizer and rendered into rice grain size pellets with moisture adjustment attained by adding the necessary amounts of water.

Meanwhile, other materials to be mixed with the rice grain size green pellets for sintering are stored separately in their corresponding reserving pits (in the drawings only two pits for various types of powdered ores, powdered coke and other materials are shown for clear understanding). Each of these various materials is taken out from its respective reserving pit and placed on the same conveyer at a rate in accordance with the proportions of the desired mixture. The withdrawal of the material is handled by a constant feed weigher attached to the respective reserving pit. The materials are then charged into a drum mixer and mixed with any required moisture adjustment provided by adding the necessary amount of water. Then the rice grain size green pellets are added to the mixture on the conveyer leading to a surge hopper to form the final mixture for sintering. The finally mixed materials for sintering are charged into a surge hopper and then into a D. L. sintering machine where they are rendered into a sintered product through an ordinary sintering process.

As mentioned before, FIG. 5 shows only one embodiment of the present invention, and the process and apparatus for working the present invention should not be limited to those shown in FIG. 5. For example, for collecting the iron-containing dry dust the exhaust gas from the L. D. steel making process can be cooled to a prefixed temperature by a suitable means (water and air etc.) without passing it through a waste heat boiler and then collecting the iron-containing electric dust collecting machine.

As it is most preferable that the rice grain size green pellets be produced according to the mixing proportion of the other materials with which the pellets are to be sintered, it is shown in FIG. 5 that the rice grain size green pellets produced are not reserved in a reserving pit but are added directly and mixed with other materials to be sintered. However, when the rice grain size green pellets are produced in excess of the amount required in the mixture proportions of the other sintering materials, the excess rice grain size green pellets may be temporarily stored in the reserving pit, and then removed in the necessary amounts to be added and mixed with the other materials to be sintered. Further, the rice grain size green pellets can be used alone for producing a sintered product without mixing them with the other materials.

Referring to the apparatus, the pug-mill used to mix the materials before they are charged into the disk-type pelletizer may be any of the type of ordinary mixer, such as a drum-mixer or the like. Moreover, the disk-type pelletizer may be of any known type of rotating agglomerating machine. Further, a G.W. sintering machine may be used instead of the D.L. sintering machine.

In addition to the iron-containing dry dust obtained from the exhaust gases of an L.D. convertor, or those obtained in the exhaust gases from an oxygen steel making furnace such as an open hearth furnace and the like, the iron oxide powders obtained by roasting the sludge collected from a hydrochloric acid pickling line for hot coils can also be used in working the rice grain size green pellets.

EXAMPLE I

To 75% of iron sand having a particle size distribution as shown an item *a* in Table 1 there was added 25% of an open-hearth furnace dust having a moisture content of 0.5% and an average particle size of 0.2 micron. The mixture was thoroughly mixed and fed at the rate of 1 ton by dry weight per hour into a disk-type pelletizer having a diameter of 1 m. and granulated under the addition of water at the rate of 40 kg. per hour while the granulation disk was rotated with a disk content of 20 cm. in depth, at 20 r.p.m. and with a dip of 60°, whereby a continuous production of rice grain size green pellets having a particle size distribution shown in Table 2 was attained. The moisture content of the pellets was 6%. By dropping some of the pellets ranging in size from 2-5 mm. from a height of 1 mm. onto an iron plate 10 times and adopting the yield of +2 mm. portion as the measure of a strength, the pellets were found to have a shatter strength of 85%.

TABLE 2

Particle size distribution of rice grain size green pellets

| | Percent |
|---|---|
| −2 mm. | 3.7 |
| 2–5 mm. | 93.7 |
| 5–10 mm. | 2.6 |

The pellets thus obtained were added at the rate of 5–20% to a composite sintering material having a moisture content of 6% and the composition shown in Table 3 was sintered in a 30 kg. sintering experiment pot. The permeability of the product was improved as shown by solid line in FIG. 6 more or less positively as compared with the product prepared without the addition of the pellets, while the falling strength and productivity were positively improved. To the contrary, addition of non-processed iron sand to the sintering material caused not only the falling strength to be increased as illustrated by dotted line in FIGURE 6 but also the permeability and productivity to be decreased.

TABLE 3

Composition of sintering composite material

| Materials: | Percent |
|---|---|
| Magnetite ore from South America | 31.3 |
| Magnetite ore from Canada | 7.1 |
| Hematite ore from India | 11.5 |
| Pyrite cinder | 5.7 |
| Mill scale | 5.7 |
| Lime stone | 8.4 |
| Return | 27.9 |
| Coke fine | 2.4 |

EXAMPLE 2

Powdered samples of Texada magnetite ore, Musan magnetite ore and Kenedylake magnetite having particle size distribution of *c*, *d* and *e* in Table 1, respectively, were adjusted to afford a uniform moisture content of 3%, were added to dry converter dust having an average particle size of 0.3 micron and then granulated under the same conditions as stated in Example 1, with rice grain size green pellets being successfully formed as shown by the data in Table 4.

TABLE 4

| Raw materials combined | | Properties of the rice grain size green pellets produced | | |
|---|---|---|---|---|
| Fine ore powder | Converter dust | Moisture content | Yield of 2–5 mm. fraction | Falling strength |
| Texada, 85% | 15 | 7.2 | 73.6 | 84 |
| Musan, 80% | 20 | 7.9 | 70.9 | 87 |
| Kenedylake, 80% | 20 | 6.0 | 63.0 | 86 |

EXAMPLE 3

To a sample of iron sand having a particle size distribution of *b* in Table 1 and adjusted to a moisture content of 7% there was added 29% of a converter dust the main part of which had a particle size smaller than 1 micron and a moisture content was between 0–0.5% After mixing, the mixture was introduced at the rate of 10 tons per hour into a disk-type pelletizer of 3.2 m. in diameter and granulated with the addition of water at the rate of 150 kg. per hour, the machine had a disk depth of 42.5 cm., 12 r.p.m. and a dip of 55°. The rice grain size green pellets thus produced had a moisture content of 6.5%. Their particle size distribution, on the average, was as follows: smaller than 2 mm. 8.9%, 2–5 mm. 80.6%, 5–7 mm. 6.5% and greater than 7 mm. 4.0% and their falling strength was 96.5%.

TABLE 1.—PARTICLE SIZE DISTRIBUTION OF FINELY DIVIDED MATERIAL

| Brand | Particle size | | | | | | |
|---|---|---|---|---|---|---|---|
| | 0.062 | 0.062–0.125 | 0.125–0.25 | 0.25–0.5 | 0.5–1 | 1–2 | +2 |
| (a) Iron sand | 0.2 | 26.5 | 53.8 | 18.5 | 1.0 | 0 | 0 |
| (b) Iron sand | 4.3 | 36.9 | 48.8 | 9.5 | 0.5 | 0 | 0 |
| (c) Texada | 28.8 | 21.1 | 22.0 | 17.2 | 5.7 | 1.0 | 4.2 |
| (d) Musan | 40.4 | 21.0 | 23.8 | 9.7 | 2.8 | 0.8 | 1.6 |
| (e) Kenedylake | 15.0 | 12.5 | 20.5 | 24.5 | 19.3 | 7.5 | 0.7 |

What is claimed is:
1. A sintering material formed as pellets having a size range of two to five mm. and being made from a mixture comprising an iron containing dry dust produced in oxygen steel making processes and iron oxide powder recovered from pickling waste and having a moisture content of less than 1.5% and a particle size of less than 1 micron, and a finely powdered iron ore having a moisture content between 2 to 10 percent, said iron containing dry dust consituting 15 to 60% of the weight of the mixture.

2. A sintering material, as set forth in claim 1, wherein the sintering material has a moisture content in the range between 5 and 9.5%.

3. A sintering material, as set forth in claim 1, wherein at least 60% of the finely powdered ore is within a particle range defined on a graph, as set forth in FIG. 3, in which the horizontal axis contains a logarithmic scale indicating the diameter of the particle size ranging from 31.2 to 4000 microns and the vertcial axis contains a normal probability type of scale of the cumulative weight particle size distribution ranging from 1 to 90% and the particle range being limited between a first straight line and a second straight line on the graph with the first line extending from a point defined by the horizontal coordinate of 31.2 microns and the vertical coordinate of 10% through a point defined by the horizontal coordinate of 125 microns and the vertical coordinate of 80% and the second line extending from a point defined by the horizontal coordinate of 31.2 microns and a vertical coordinate of 1% through a point defined by the horizontal coordinate of 1000 microns and a vertical coordinate of 90%.

References Cited
UNITED STATES PATENTS

| | | | |
|---|---|---|---|
| 2,767,074 | 10/1956 | Bradwell | 75—5 |
| 2,866,699 | 12/1958 | Weilandt et al. | 75—5 |
| 2,914,395 | 11/1959 | Davies | 75—5 |
| 3,148,971 | 9/1964 | Macdonald et al. | 75—5 |
| 3,151,844 | 10/1964 | Holowaty et al. | 75—5 X |
| 3,249,422 | 5/1966 | Sironi et al. | 75—5 |
| 3,326,669 | 6/1967 | Stirling | 75—5 |

L. DEWAYNE RUTLEDGE, Primary Examiner

E. L. WEISE, Assistant Examiner